(12) United States Patent
Takushima et al.

(10) Patent No.: US 7,068,877 B2
(45) Date of Patent: Jun. 27, 2006

(54) MOVABLE MIRROR DEVICE, DISPERSION COMPENSATOR, GAIN EQUALIZER, AND OPTICAL ADM APPARATUS

(75) Inventors: Michiko Takushima, Yokohama (JP); Makoto Katayama, Yokohama (JP); Tomohiko Kanie, Yokohama (JP); Takayuki Shimazu, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 33 days.

(21) Appl. No.: 10/887,305

(22) Filed: Jul. 9, 2004

(65) Prior Publication Data

US 2005/0025415 A1 Feb. 3, 2005

Related U.S. Application Data

(60) Provisional application No. 60/486,922, filed on Jul. 15, 2003.

(30) Foreign Application Priority Data

Jul. 10, 2003 (JP) .............................. 2003-273017
Jun. 21, 2004 (JP) .............................. 2004-182963

(51) Int. Cl.
*G02B 6/28* (2006.01)

(52) U.S. Cl. .......................................... 385/24; 385/18

(58) Field of Classification Search ...................... None
See application file for complete search history.

(56) References Cited

U.S. PATENT DOCUMENTS

| 5,960,133 A * | 9/1999 | Tomlinson .................... 385/18 |
| 6,263,123 B1 * | 7/2001 | Bishop et al. ................. 385/15 |
| 6,493,488 B1 * | 12/2002 | Islam et al. .................... 385/47 |
| 6,924,581 B1 * | 8/2005 | Greywall ..................... 310/309 |
| 2002/0109894 A1 * | 8/2002 | Clark et al. .................. 359/224 |

FOREIGN PATENT DOCUMENTS

JP     2002-303805     10/2002

\* cited by examiner

*Primary Examiner*—Sung Pak
(74) *Attorney, Agent, or Firm*—McDermott Will & Emery LLP

(57) ABSTRACT

A movable mirror device has a plurality of reflecting mirrors and a plurality of mirror drivers. The plurality of reflecting mirrors are reflecting mirrors to reflect signal light and are arranged in a one-dimensional direction along a predetermined plane. The plurality of mirror drivers are arranged two-dimensionally relative to the one-dimensional direction and individually drive the respective reflecting mirrors.

12 Claims, 19 Drawing Sheets

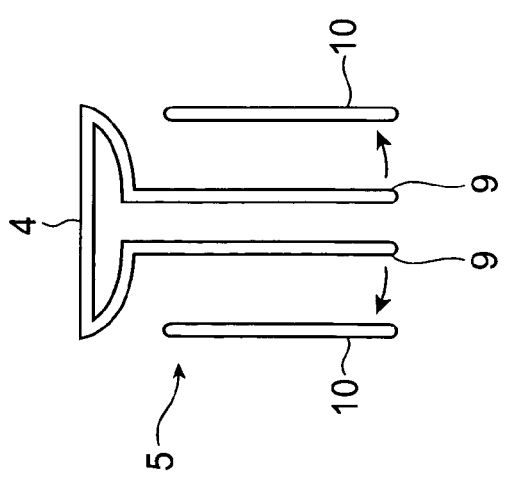
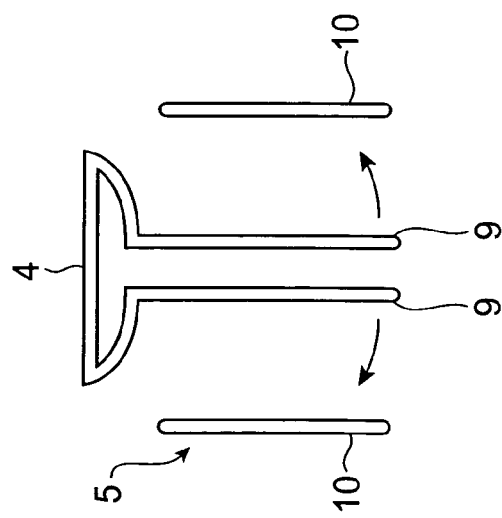
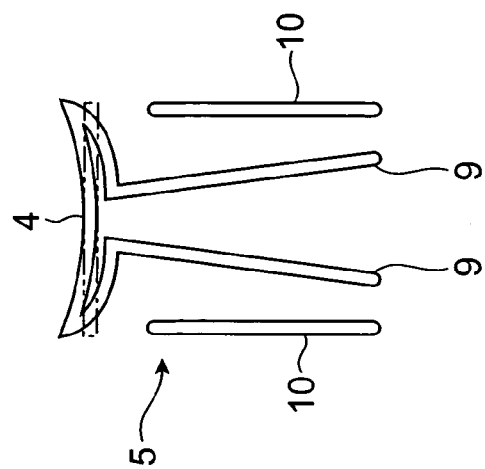
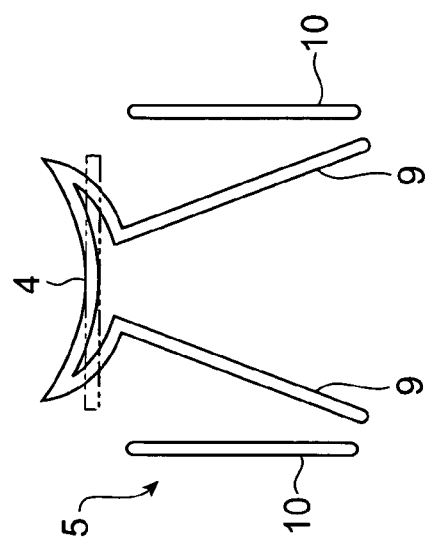
Fig.9A
Fig.9B

MOVABLE MIRROR DEVICE, DISPERSION COMPENSATOR, GAIN EQUALIZER, AND OPTICAL ADM APPARATUS

CROSS-REFERENCE TO RELATED APPLICATION

This application claims priority to Provisional Application Ser. No. 60/486,922 filed on Jul. 15, 2003 which are hereby incorporated by reference in their entirety.

BACKGROUND OF THE INVENTION

1. Field of the Invention

The present invention relates to a movable mirror device, a dispersion compensator, a gain equalizer, and an optical ADM apparatus used in wavelength division multiplexing optical telecommunications and others.

2. Related Background of the Invention

An example of the movable mirror device is the one described in Patent Document 1: Japanese Patent Application Laid-Open No. 2002-303805. The movable mirror device described in Patent Document 1 is installed in a tunable dispersion compensator, and has a plurality of movable reflecting mirrors each individually driven and controlled so that light reflection positions of the respective movable reflecting mirrors become desired positions.

SUMMARY OF THE INVENTION

The movable mirror devices are being used in various devices in the field of optical telecommunications and, in order to miniaturize the devices, it is preferable to make the reflecting mirrors themselves smaller and to make the spacing between the reflecting mirrors as small as possible. Particularly, in the case, as in the above prior art, where the movable mirror device is combined with a spatial wavelength separator to effect signal processing for each of wavelengths, in order to secure a sufficient bandwidth of each channel, it is necessary to arrange the reflecting mirrors with little clearance between them. On the other hand, in the dispersion compensator as in the above prior art, increase in the movable range of the reflecting mirrors is desired to provide a large amount of dispersion compensation.

An object of the present invention is to provide a movable mirror device, a dispersion compensator, a gain equalizer, and an optical ADM apparatus in which a plurality of reflecting mirrors are arranged at a narrow pitch and with a greater movable range.

A movable mirror device of the present invention comprises: (a) a plurality of reflecting mirrors for reflecting signal light, the reflecting mirrors being arranged in a one-dimensional direction along a predetermined plane; and (b) a plurality of mirror drivers for driving the respective reflecting mirrors individually, the plurality of mirror drivers being arranged two-dimensionally relative to the one-dimensional direction. The plurality of mirror drivers are alternately provided in a first region and in a second region, the first region and the second region being located in order in a direction intersecting with the one-dimensional direction.

By two-dimensionally arranging the mirror drivers relative to the reflecting mirrors one-dimensionally arranged, as described above, it becomes feasible to set the width of the mirror drivers adequately larger than the width of the reflecting mirrors, even in the case where the plurality of reflecting mirrors are arranged at a narrow pitch. For example, in a case where each mirror driver is comprised of a movable electrode and a stationary electrode and where the movable electrode is displaced relative to the stationary electrode to move the reflecting mirror coupled to the movable electrode, the increase in the width of the mirror driver lengthens the spacing between the movable electrode and the stationary electrode. Therefore, the displacement amount of the movable electrode can be increased by that degree, which increases the movable range of the reflecting mirror.

Preferably, a distance between centers of the mirror drivers adjacent to each other in the arrangement direction of the reflecting mirrors is larger than a distance between centers of the reflecting mirrors adjacent to each other. Since this configuration makes the width of the mirror drivers larger than the width of the reflecting mirrors, the movable range of the reflecting mirrors can be increased with certainty even in the case where the plurality of reflecting mirrors are arranged at a narrow pitch.

Preferably, the plurality of mirror drivers consist of first drivers provided on a first substrate so as to be one-dimensionally arranged, and second drivers provided on a second substrate so as to be one-dimensionally arranged; the plurality of reflecting mirrors consist of first mirrors provided corresponding to the first drivers on the first substrate, and second mirrors provided corresponding to the second drivers on the second substrate; and the first mirrors and the second mirrors are alternately arranged.

The movable mirror device of the present invention further comprises a first substrate and a second substrate facing each other. The plurality of reflecting mirrors include first mirrors provided on the first substrate and second mirrors provided on the second substrate. The plurality of mirror drivers include first drivers provided on the first substrate and adapted to drive the first mirrors, and second drivers provided on the second substrate and adapted to drive the second mirrors. The predetermined plane extends in a direction intersecting with the first substrate and with the second substrate, and the one-dimensional direction is a direction substantially parallel to the first substrate and the second substrate. The first mirrors and the second mirrors are alternately arranged between the first substrate and the second substrate. The first region and the second region are located in order in a direction from the first substrate to the second substrate, the first drivers are located in the first region, and the second drivers are located in the second region. The first mirrors and the second mirrors are provided along the predetermined plane in the first region and in the second region.

As described above, the movable mirror device with the plurality of reflecting mirrors arranged in the one-dimensional direction and with the plurality of mirror drivers two-dimensionally arranged can be readily formed by combining a component in which the first mirrors and the first drivers are provided on the first substrate, with a component in which the second mirrors and the second drivers are provided on the second substrate.

Preferably, at least one of the first substrate and the second substrate is provided with a plurality of support members for coupling the first substrate to the second substrate. This can prevent the first drivers provided on the first substrate from coming into contact with the second drivers provided on the second substrate. Therefore, for example, where the reflecting mirrors are moved with supply of an electric signal to the mirror drivers, the reflecting mirrors can be stably driven.

Preferably, the support members comprise positioning means for positioning the first substrate relative to the second substrate. This permits the first substrate to be readily and securely positioned relative to the second substrate in assembly of the movable mirror device.

Preferably, the reflecting mirrors are deformable in curved shape, and the mirror drivers are configured to deform the reflecting mirrors in curved shape. This enables the movable mirror device to be applied, for example, to a dispersion compensator for giving signal light a phase shift to compensate for dispersion of the signal light.

In this configuration, preferably, each mirror driver has two movable electrodes fixed to two side portions of the reflecting mirror, and two stationary electrodes each placed outside the respective movable electrodes, and the reflecting mirror is deformed in curved shape by applying a voltage between the movable electrodes and the stationary electrodes. In this case, the simple configuration can bend the reflecting mirror in concave shape.

Each mirror driver has two movable electrodes and two stationary electrodes. The two movable electrodes are fixed to two side portions of the reflecting mirror in the one-dimensional direction and extend in a direction intersecting with the predetermined plane. The two stationary electrodes extend in a direction intersecting with the predetermined plane outside the movable electrodes in the one-dimensional direction. The reflecting mirror is supported at a portion along a center axis intersecting with the one-dimensional direction, and the movable electrodes move toward the stationary electrodes by a voltage applied between the movable electrodes and the stationary electrodes. In this configuration, the reflecting mirror is deformed around its center axis with movement of the movable electrodes.

Each mirror driver has two movable electrodes fixed to two side portions of the reflecting mirror, and a stationary electrode placed between the movable electrodes, and the reflecting mirror is deformed in curved shape by applying a voltage between the movable electrodes and the stationary electrode. In this case, the simple configuration can bend the reflecting mirror in convex shape.

Each mirror driver has two movable electrodes and a stationary electrode. The two movable electrodes extend in a direction intersecting with the predetermined plane and are fixed to two side portions in the one-dimensional direction of the reflecting mirror. The stationary electrode extends in a direction intersecting with the predetermined plane and is placed between the movable electrodes. The reflecting mirror is supported at a portion along a center axis intersecting with the one-dimensional direction, and the movable electrodes move toward the stationary electrode by a voltage applied between the movable electrodes and the stationary electrode. In this configuration, the reflecting mirror is deformed into a convex surface around its center axis with movement of the movable electrodes.

A dispersion compensator of the present invention comprises light demultiplexing means, the aforementioned movable mirror device, and light multiplexing means. The light demultiplexing means demultiplexes input signal light on a wavelength-by-wavelength basis and outputs a plurality of signal light beams. The movable mirror device reflects the plurality of signal light beams incident thereto while giving a phase shift thereto. The plurality of signal light beams reflected from the movable mirror device are multiplexed by the light multiplexing means, and multiplexed light is outputted.

By providing the aforementioned movable mirror device in this manner, the movable range of the reflecting mirrors can be increased even in the case where the plurality of reflecting mirrors are arranged at a narrow pitch. This increases the amount of dispersion compensation, thereby enabling highly accurate dispersion compensation.

A gain equalizer of the present invention comprises light demultiplexing means, the aforementioned movable mirror device, and light multiplexing means. The light demultiplexing means demultiplexes input signal light on a wavelength-by-wavelength basis and outputs a plurality of signal light beams. The movable mirror device changes directions of reflection of the signal light beams from the light demultiplexing means. The light multiplexing means multiplexes the plurality of signal light beams reflected by the movable mirror device and outputs multiplexed light. This gain equalizer is configured so that the movable mirror device changes the reflection directions of the respective wavelength components of the input signal light whereby the signal light outputted from the light multiplexing means can have a desired gain of each wavelength component.

An optical ADM apparatus of the present invention comprises an input port waveguide through which input signal light is supplied, an output port waveguide through which output signal light is supplied, an add port waveguide through which an add signal is supplied, a drop port waveguide through which a drop signal is supplied, light demultiplexing means, the aforementioned movable mirror device, and light multiplexing means. The light demultiplexing means demultiplexes the input signal light from the input port waveguide on a wavelength-by-wavelength basis and outputs a plurality of signal light beams. The movable mirror device changes directions of reflection of the signal light beams and the add signal, and outputs them. The light multiplexing means outputs part of the signal light beams outputted from the movable mirror device, as a drop signal to the drop port waveguide, and outputs the output signal light resulting from combination of the other part of the signal light beams with the add signal, to the output port waveguide. In this optical ADM apparatus, the movable mirror device can change the reflection directions of the signals on a wavelength-by-wavelength basis so that signal light of a desired wavelength component in the input signal light, or the add signal is outputted to a desired waveguide.

BRIEF DESCRIPTION OF THE DRAWINGS

FIG. 9A is an illustration showing an operation state of a reflecting mirror and a mirror driver arranged as shown in FIG. 8;

FIG. 9B is an illustration showing an operation state of a reflecting mirror and a mirror driver arranged as shown in FIG. 7;

DESCRIPTION OF THE PREFERRED EMBODIMENTS

Figure 1:
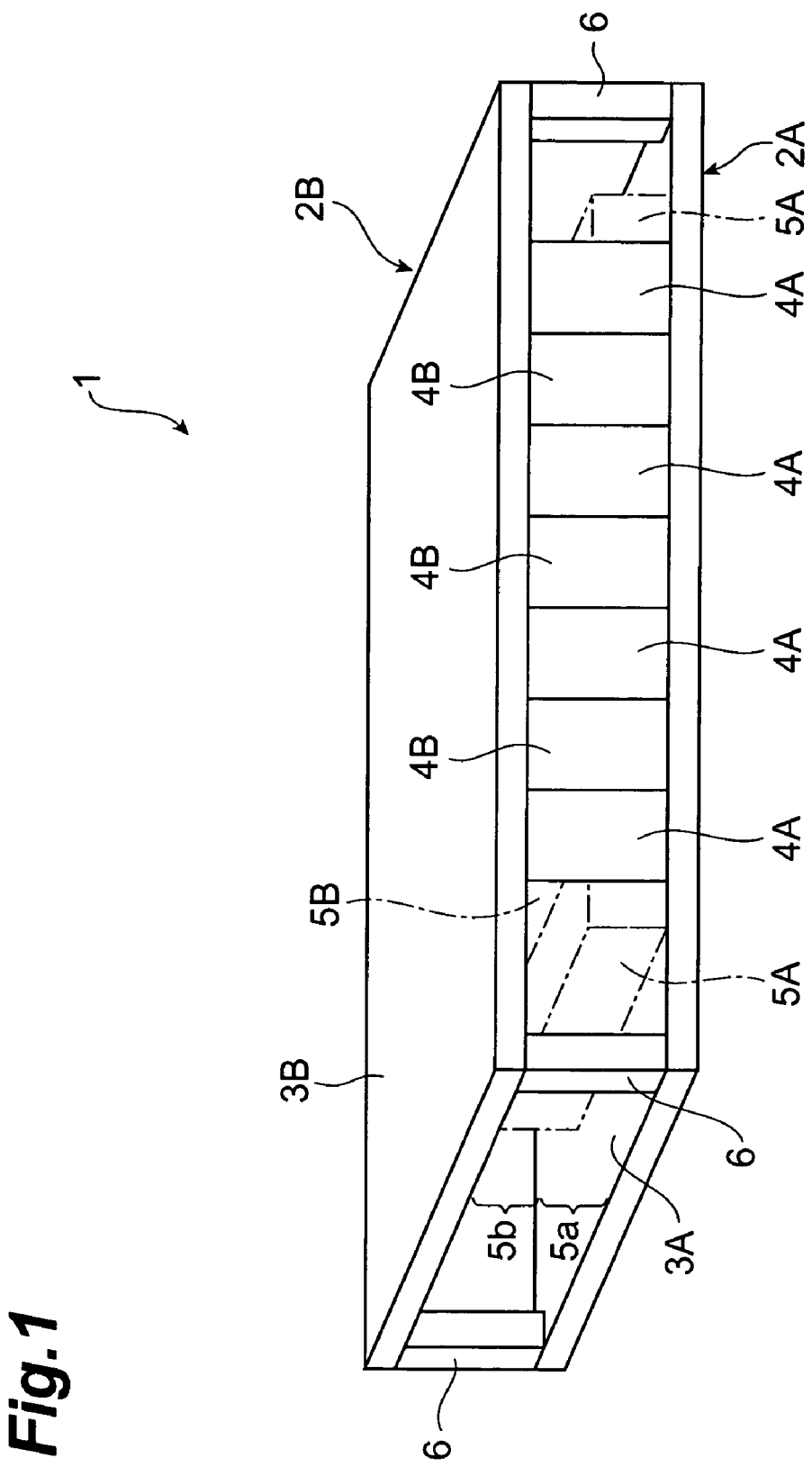
FIG. 1 is a schematic perspective view showing an embodiment of a movable mirror device according to the present invention.

Referring to the drawings, the preferred embodiments of the present invention will be described below. FIG. 1 is a schematic perspective view showing an embodiment of a movable mirror device according to the present invention. In the same figure, the movable mirror device 1 of the present embodiment is constructed of a combination of two mirror array chips 2A, 2B fabricated, for example, by application of the MEMS (Micro Electro Mechanical Systems) technology.

Figure 2:
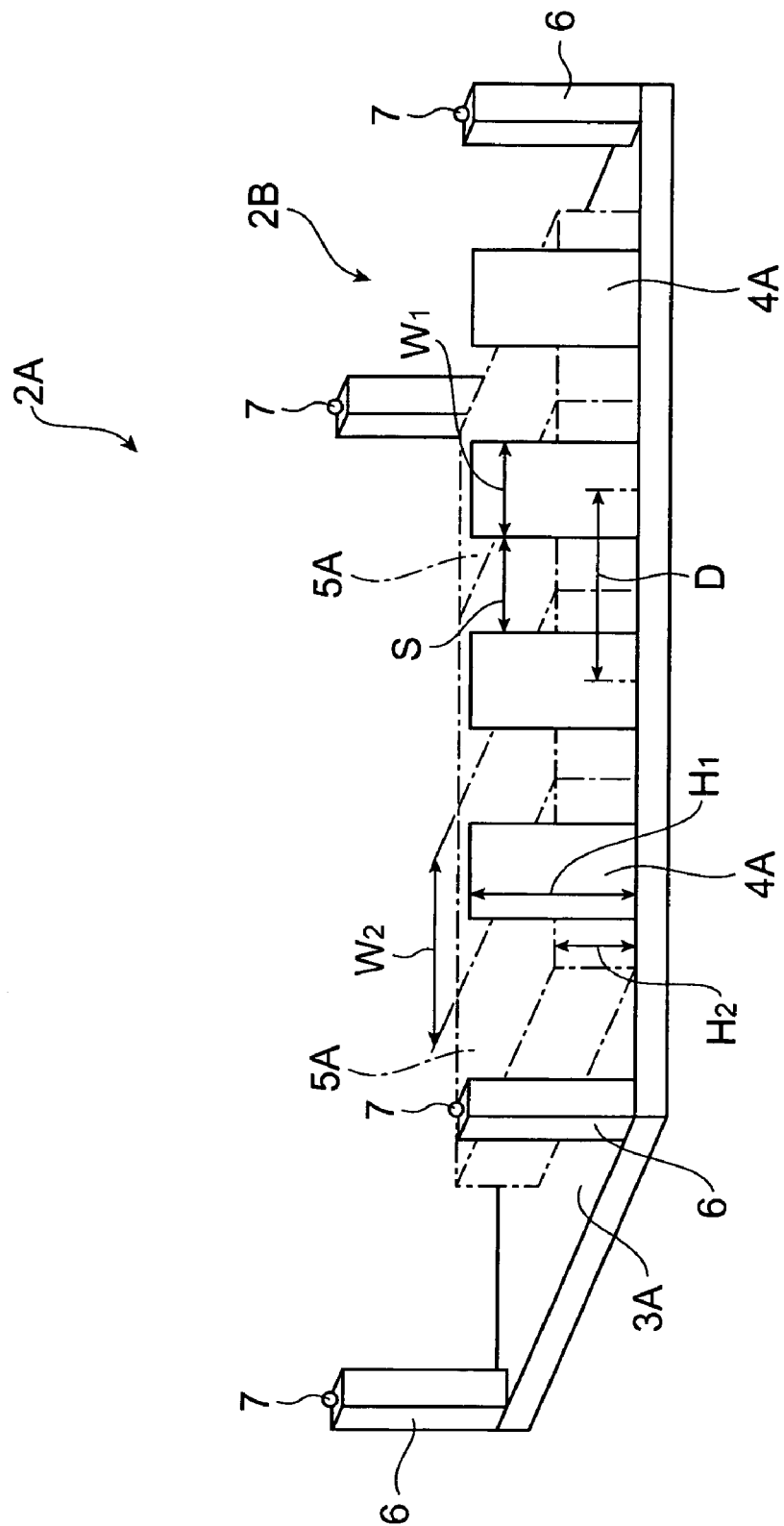
FIG. 2 is a schematic perspective view showing one of mirror array chips shown in FIG. 1.

FIG. 2 is a schematic perspective view showing one of the mirror array chips shown in FIG. 1. The mirror array chip 2A has a rectangular substrate 3A (first substrate), as shown in FIG. 2, and this substrate 3A is provided with a plurality of reflecting mirrors 4A for reflecting signal light, and a plurality of mirror drivers 5A (first drivers) for individually driving the respective reflecting mirrors 4A.

The reflecting mirrors 4A are arranged in a one-dimensional direction while being spaced with a certain spacing. This one-dimensional direction is a direction substantially parallel to the substrate 3A. The reflecting mirrors 4A (first mirrors) are arranged in the one-dimensional direction along a predetermined plane. This predetermined plane is a virtual plane extending in a direction intersecting with the substrate 3A and with the substrate 3B in an assembled state of the mirror array chip 2A and the mirror array chip 2B.

A width $W_1$ of each reflecting mirror 4A is not more than half of a distance D between centers of adjacent reflecting mirrors 4A. For example, the width $W_1$ of each reflecting mirror 4A is half of the center-center distance D of adjacent reflecting mirrors 4A, and is equal to a space S between adjacent reflecting mirrors 4. The mirror drivers 5A are also one-dimensionally arranged. A width $W_2$ of each mirror driver 5A is larger than half of the center-center distance D of adjacent reflecting mirrors 4A. For example, the width $W_2$ of each mirror driver 5A is approximately equal to the center-center distance D of adjacent reflecting mirrors 4A and is approximately double the width $W_1$ of reflecting mirror 4A. A height $H_1$ of each reflecting mirror 4A is about double a height $H_2$ of each mirror driver 5A.

Four support members 6 for being coupled to the mirror array chip 2B stand on the upper surface of the substrate 3A. The height of the support members 6 is a little larger than the height $H_1$ of the reflecting mirrors 4A. Positioning projections 7 are provided on top portions of the respective support members 6.

Figure 3:
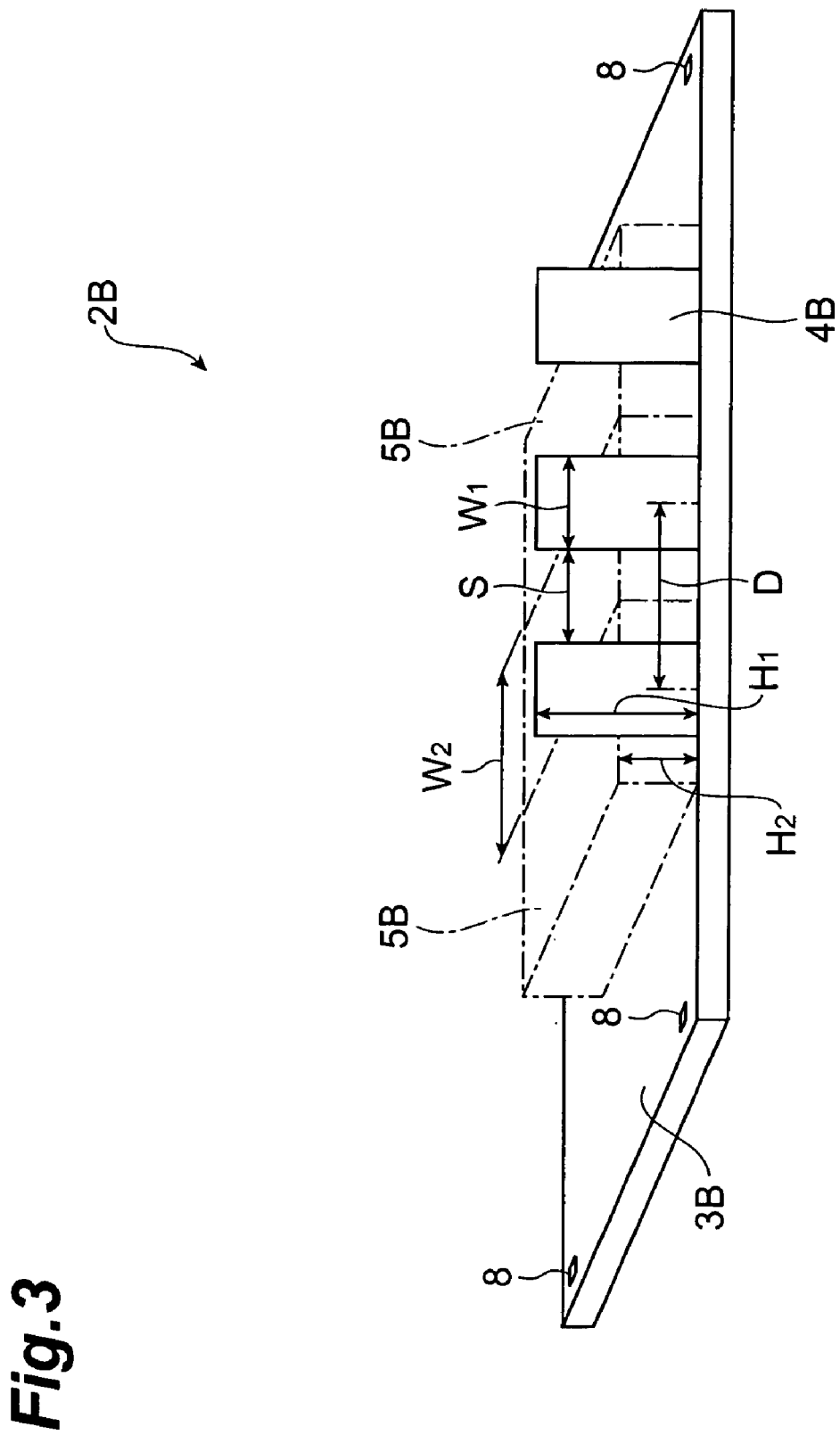
FIG. 3 is a schematic perspective view showing the other of mirror array chips shown in FIG. 1.

FIG. 3 is a schematic perspective view showing the other of the mirror array chips shown in FIG. 1. The mirror array chip 2B has a rectangular substrate 3B (second substrate), as shown in FIG. 3, and this substrate 3B is provided with a plurality of reflecting mirrors 4B (second mirrors) for reflecting signal light, and a plurality of mirror drivers 5B (second drivers) for individually moving the respective reflecting mirrors 4B. The structure, dimensions, arrangement pitch, etc. of each reflecting mirror 4B are similar to those of the aforementioned reflecting mirrors 4A, and the structure, dimensions, arrangement pitch, etc. of each mirror driver 5B are similar to those of the aforementioned mirror drivers 5A. The substrate 3B is provided with four positioning recesses 8 to engage with the positioning projections 7 provided on the support members 6 of the mirror array chip 2A.

The mirror array chips 2A, 2B as described above are formed, for example, by anisotropic etching of a silicon substrate. Surfaces of the reflecting mirrors 4A, 4B are coated with gold or the like, in order to increase optical reflectance.

Figure 4:
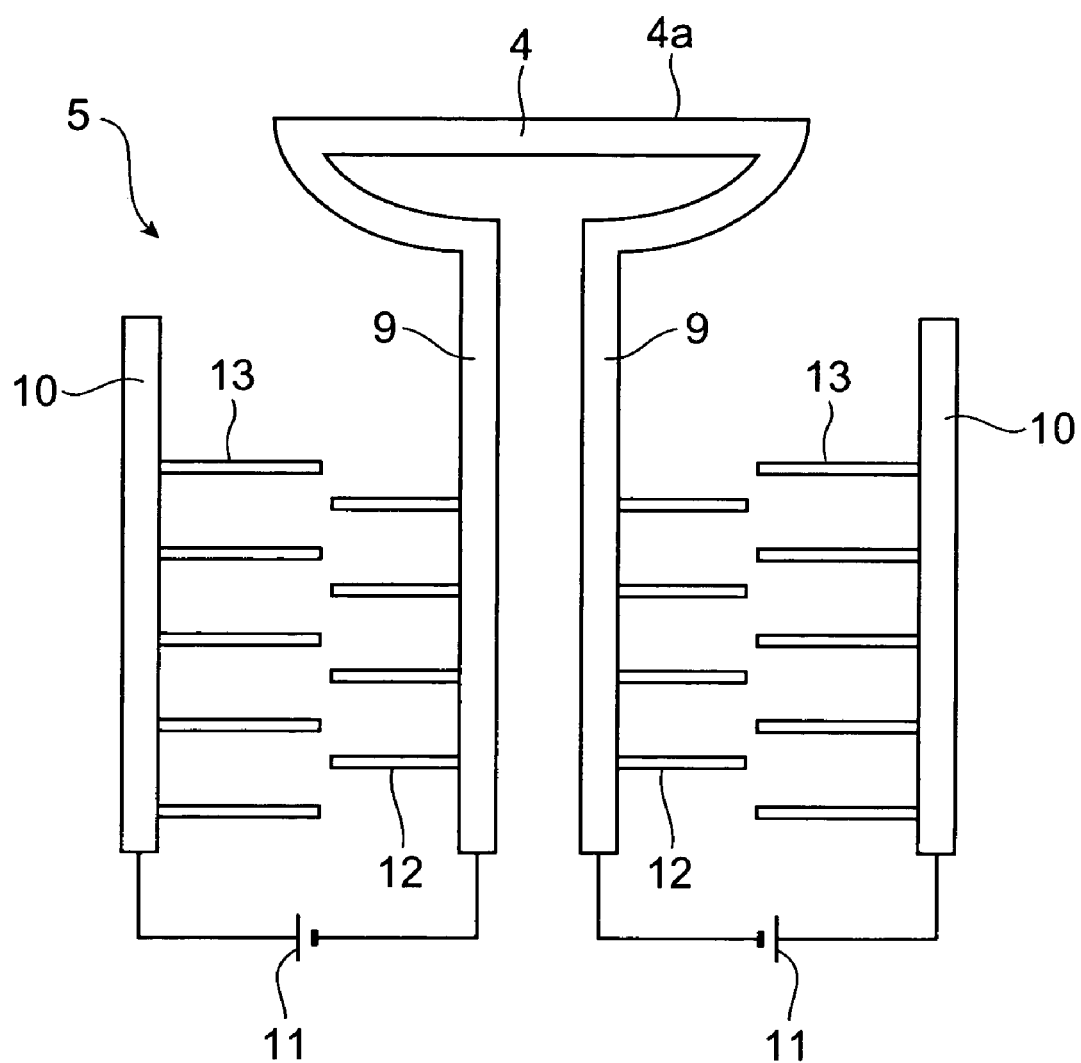
FIG. 4 is an illustration showing a specific configuration of a mirror driver shown in FIG. 1.

A specific configuration of the mirror drivers 5A, 5B is presented in FIG. 4. FIG. 4 is an illustration showing a specific configuration of a mirror driver shown in FIG. 1. In the description hereinafter, the reflecting mirrors 4A, 4B are sometimes represented by a generic term of reflecting mirror 4, the mirror drivers 5A, 5B by a generic term of mirror driver 5, and the substrates 3A, 3B by a generic term of substrate 3.

As shown in FIG. 4, the mirror driver 5 is coupled and fixed to both ends of reflecting mirror 4. The mirror driver 5 has two nearly L-shaped movable electrodes 9 extending backward from the reflecting mirror 4 (on the opposite side to a reflecting surface 4a), and stationary electrodes 10 placed so as to face the movable electrodes 9, outside the respective movable electrodes 9. A center part of the reflecting mirror 4 is fixed to the substrate (not shown). This makes the reflecting mirror 4 deformable in curved shape around an axis at the center part (cf. FIG. 9B).

Each movable electrode 9 is coupled through a tunable voltage source 11 to the associated stationary electrode 10. When this tunable voltage source 11 applies a voltage between the movable electrode 9 and the stationary electrode 10, an electrostatic force is generated between them, and the electrostatic force attracts the movable electrode 9 toward the stationary electrode 10, whereby the reflecting mirror 4 is bent in concave shape (cf. FIG. 9B). At this time, an amount of flexure of the reflecting mirror 4 varies with change in the applied voltage by the tunable voltage source 11.

The movable electrode 9 is an interdigital electrode with fingers 12 extending toward the stationary electrode 10, and the stationary electrode 10 is an interdigital electrode with fingers 13 extending toward the movable electrode 9. By using the interdigital electrodes as the electrodes 9, 10 in this manner, the electrostatic force is increased between the electrodes 9, 10, and thus the movable electrode 9 can be driven by the voltage lowered by that degree.

Figure 5:
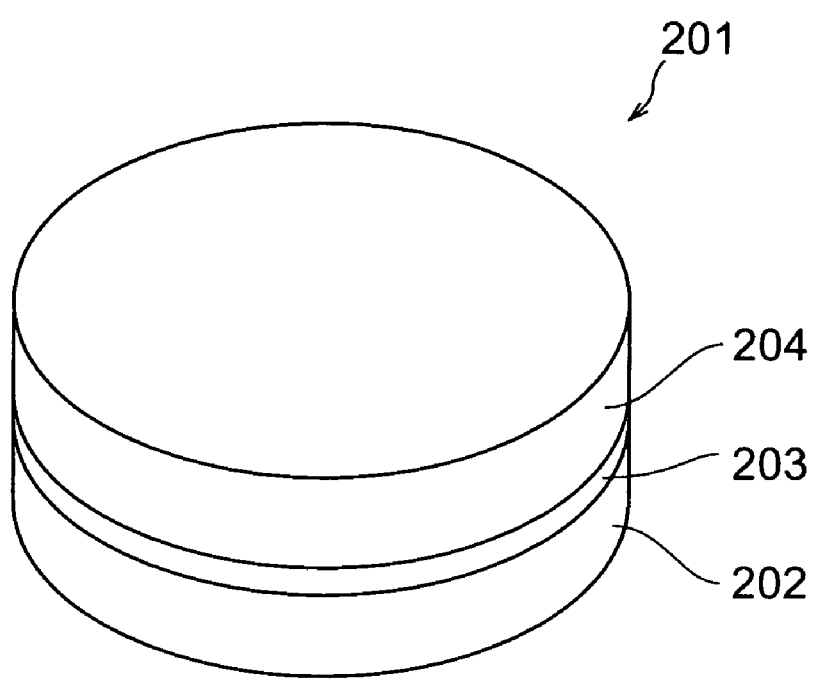
FIG. 5 is an illustration showing a layer structure used in production of reflecting mirrors and mirror drivers.
Figure 6:
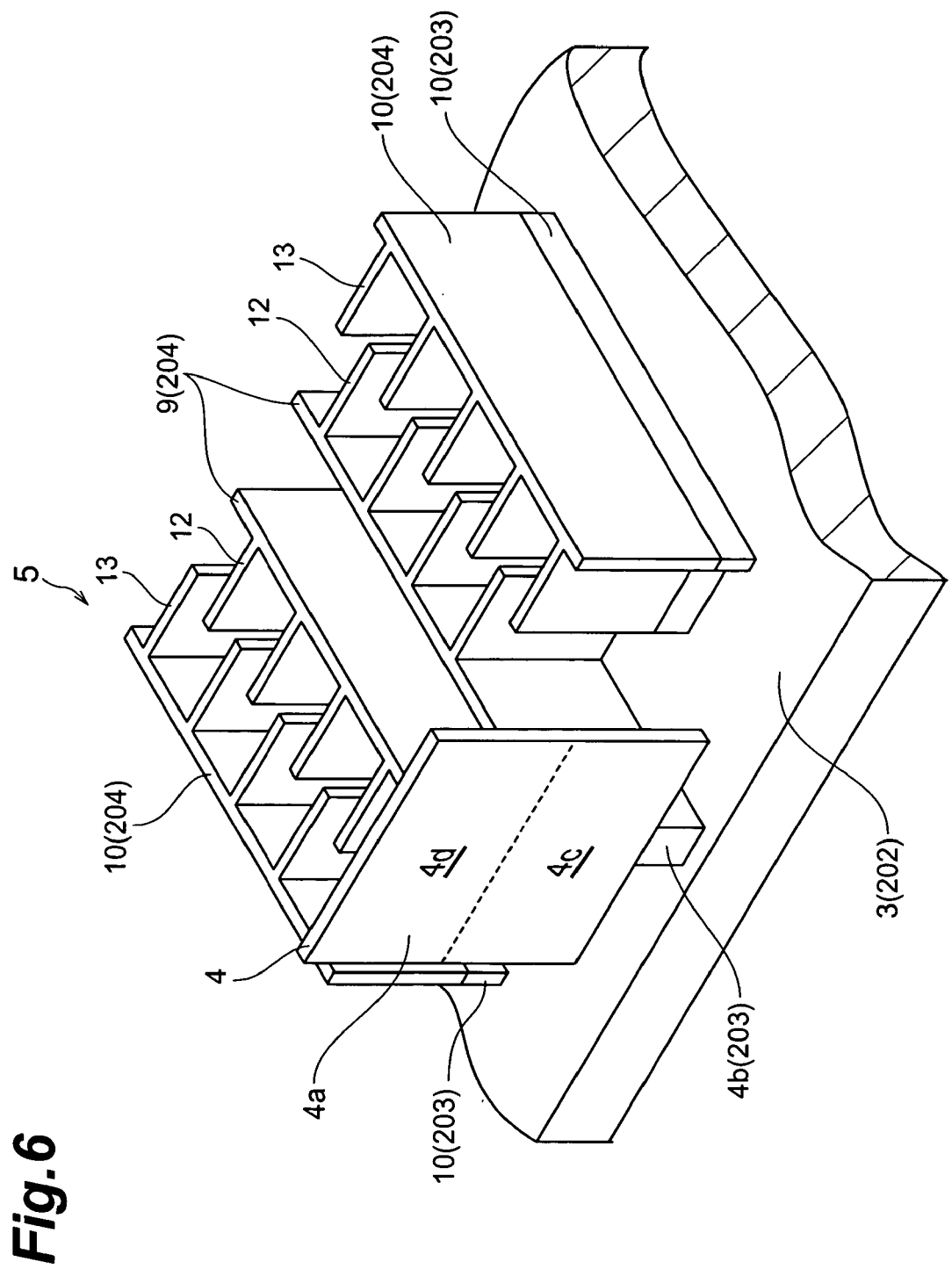
FIG. 6 is a perspective view of a reflecting mirror and a mirror driver produced using the layer structure shown in FIG. 5.

A method of production of the reflecting mirror 4 and mirror driver 5 will be described below. FIG. 5 is an illustration showing a layer structure used in production of the reflecting mirror and mirror driver. FIG. 6 is a perspective view of the reflecting mirror and mirror driver produced using the layer structure shown in FIG. 5.

The layer structure 201 shown in FIG. 5 is a silicon substrate of three-layer structure consisting of a lower silicon layer 202, an oxide film layer 203, and an upper silicon layer 204. The upper silicon layer 204 of this layer structure 201 is etched to a predetermined depth in the layer direction, thereby forming a second portion 4d of the reflecting mirror 4. Next, the upper silicon layer 204 is further etched, thereby forming a first portion 4c of the reflecting mirror 4, the movable electrodes 9, and the stationary electrodes 10. Then the oxide film layer 203 under the reflecting mirror 4 and the oxide film layer 203 under the movable electrodes 9 are etched except a fixing portion 4b, thereby producing the reflecting mirror 4 and driver 5 shown in FIG. 6.

In the reflecting mirror 4 produced in this manner, the first portion 4c and the second portion 4d are located in order in a direction intersecting with the substrate 3, and the second portion 4d of the reflecting mirror 4 projects in the mentioned direction from the mirror driver 5.

Each movable electrode 9 has a main body part and fingers 12. The main body parts of the movable electrodes 9 are connected to the both sides of the reflecting mirror 4 in the one-dimensional direction, as shown in FIG. 6, and extend on the opposite side to the reflecting surface 4a, i.e., in a direction intersecting with the predetermined plane. The fingers 12 extend in the one-dimensional direction from the main body part of each movable electrode 9. Each stationary electrode 10 has a main body part and fingers 13. The main body part of each stationary electrode 10 faces the movable electrode 9 outside the movable electrode 9 in the one-dimensional direction and extends in a direction intersecting with the predetermined plane. The fingers 13 consist of fingers 13 extending in the one-dimensional direction from the main body part of the stationary electrode 10. A portion along a center axis of the reflecting mirror 4 intersecting with the one-dimensional direction is supported through the fixing part 4b on the substrate 3. Therefore, the reflecting surface 4a of the reflecting mirror 4 is bent around the center axis by a low voltage.

In assembly of the movable mirror device 1 as shown in FIG. 1, in a state in which the mirror drivers 5A of the mirror array chip 2A are opposed to the mirror drivers 5B of the mirror array chip 2B, the positioning projections 7 on the respective support members 6 of the mirror array chip 2A are brought into fit in the respective positioning recesses 8 in the substrate 3B of the mirror array chip 2B. This permits the mirror array chips 2A, 2B to be assembled while being readily and surely positioned.

Since the substrate 3A of the mirror array chip 2A and the substrate 3B of the mirror array chip 2B are coupled through the support members 6, there is no contact between the mirror drivers 5A, 5B. This enables the movable electrodes 9 of the mirror drivers 5A, 5B to be stably operated.

A suitable assembly method of the mirror array chips 2A, 2B is, for example, flip chip bonding or the like.

Figure 7:
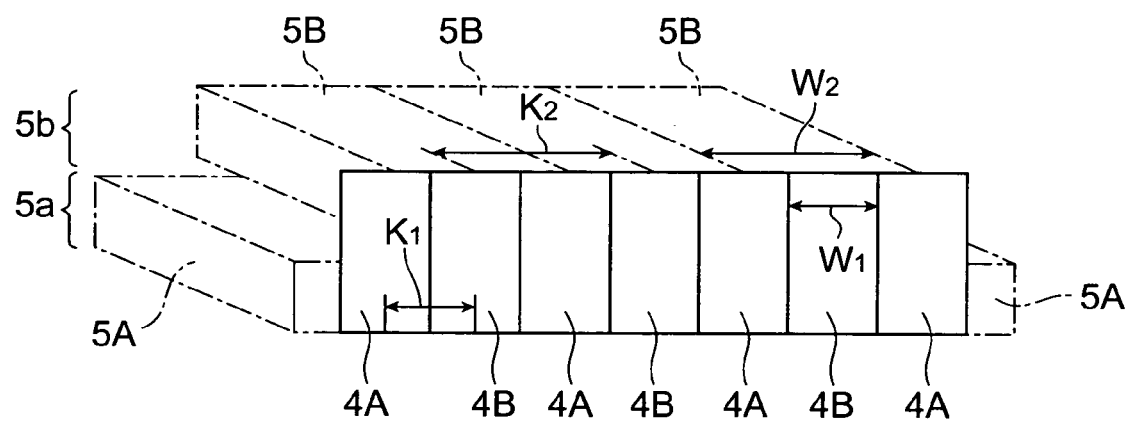
FIG. 7 is an illustration showing an arrangement structure of reflecting mirrors and mirror drivers shown in FIG. 1.

FIG. 7 is an illustration showing an arrangement structure of the reflecting mirrors and mirror drivers shown in FIG. 1. In this assembly state, as shown in FIGS. 1 and 7, the reflecting mirrors 4B of the mirror array chip 2B are interposed between adjacent reflecting mirrors 4A of the mirror array chip 2A, so that the reflecting mirrors 4A and the reflecting mirrors 4B are alternately arranged in the one-dimensional direction. The mirror drivers 5A of the mirror array chip 2A are located on the lower side, and the mirror drivers 5B of the mirror array chip 2B on the upper side. Namely, these mirror drivers 5A, 5B are two-dimensionally arranged relative to the reflecting mirrors 4A, 4B one-dimensionally arranged.

Specifically, in the movable mirror device 1 there are a first region 5a and a second region 5b located in order in the direction from the substrate 3A toward the substrate 3B. The mirror drivers 5A are provided in the first region 5a and the mirror drivers 5B in the second region 5b. The mirror drivers 5A, 5B are alternately arranged whereby the mirror drivers 5A and 5B are two-dimensionally arranged relative to the reflecting mirrors 4A, 4B arranged in the one-dimensional direction. Since each of the reflecting mirrors 4A and 4B has the first portion 4c, and the second portion 4d projecting out from the mirror driver 5, they are located in the first region 5a and in the second region 5b along the predetermined plane. Therefore, the reflecting mirrors 4A and 4B are alternately arranged in the one-dimensional direction.

At this time, the center-center distance $K_2$ between centers of mirror drivers 5A and 5B adjacent to each other in the array direction of the reflecting mirrors 4A, 4B is larger than the center-center distance $K_1$ between centers of adjacent reflecting mirrors 4A, 4B. For example, the center-center distance $K_2$ between centers of adjacent mirror drivers 5A and 5B is approximately double the center-center distance $K_1$ between centers of adjacent reflecting mirrors 4A, 4B, and the reflecting mirrors 4A, 4B are alternately arranged with little clearance between them.

Although the above movable mirror device 1 was constructed in the configuration wherein the positioning projections 7 were provided in the mirror array chip 2A and the positioning recesses 8 in the substrate 3B of the mirror array chip 2B, it is also possible to adopt a configuration wherein the positioning projections are provided in the substrate 3B and the positioning recesses in the support members 6. Another potential configuration is such that support members are provided in both the substrate 3A of the mirror array chip 2A and the substrate 3B of the mirror array chip 2B, positioning projections are formed in the support members of one substrate, and positioning recesses in the support members of the other substrate.

The means of positioning the mirror array chips 2A, 2B relative to each other may be any other means than above; for example, markings such as crosses are provided at junctions of the mirror array chips 2A, 2B and the markings are imaged and subjected to image processing, thereby achieving positioning.

Figure 8:
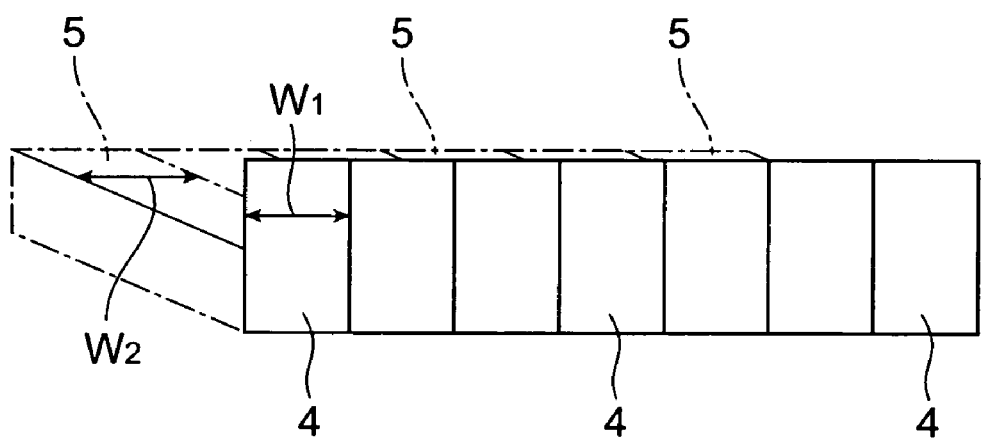
FIG. 8 is an illustration showing a conventional arrangement structure of reflecting mirrors and mirror drivers.

FIG. 8 is an illustration showing a conventional arrangement structure of reflecting mirrors and mirror drivers. In the structure in which a plurality of mirror drivers 5 are one-dimensionally arranged corresponding to the respective reflecting mirrors 4, as shown in FIG. 8, the width $W_2$ of the mirror drivers 5 must be equal to or smaller than the width $W_1$ of the reflecting mirrors 4, in order to arrange the reflecting mirrors 4 with little clearance. In this case, because of the limited space for the mirror drivers 5, the movable range of the reflecting mirrors 4 is restricted and a very large applied voltage is needed to deform the reflecting mirrors 4. FIG. 9A is an illustration showing an operation state of a reflecting mirror and a mirror driver arranged as shown in FIG. 8. In the structure in which the mirror drivers are one-dimensionally arranged as shown in FIG. 8, when a voltage is applied between the movable electrode 9 and stationary electrode 10 of the mirror driver 5, a displacement amount of the movable electrode 9 is small as shown in FIG. 9A. Accordingly, a flexure amount of the reflecting mirror 4 is small.

In contrast to it, since the present embodiment adopts the structure in which the plurality of mirror drivers 5 are two-dimensionally arranged relative to the plurality of reflecting mirrors 4 one-dimensionally arranged, the width $W_2$ of each mirror driver 5 can be set adequately larger than the width $W_1$ of each reflecting mirror 4, even in the case where the reflecting mirrors 4 are arranged with little clearance. Therefore, as apparent with reference to FIG. 9B showing an operation state of a reflecting mirror and a mirror driver arranged as shown in FIG. 7, the displacement amount of the movable electrode 9 is large with application of a voltage between the movable electrode 9 and the stationary electrode 10 of the mirror driver 5, and the flexure amount of the reflecting mirror 4 also becomes large in conjunction therewith. Accordingly, while achieving miniaturization of the movable mirror device 1, the movable range of each reflecting mirror 4 is increased and the controllability of each reflecting mirror 4 is improved.

Figure 10:
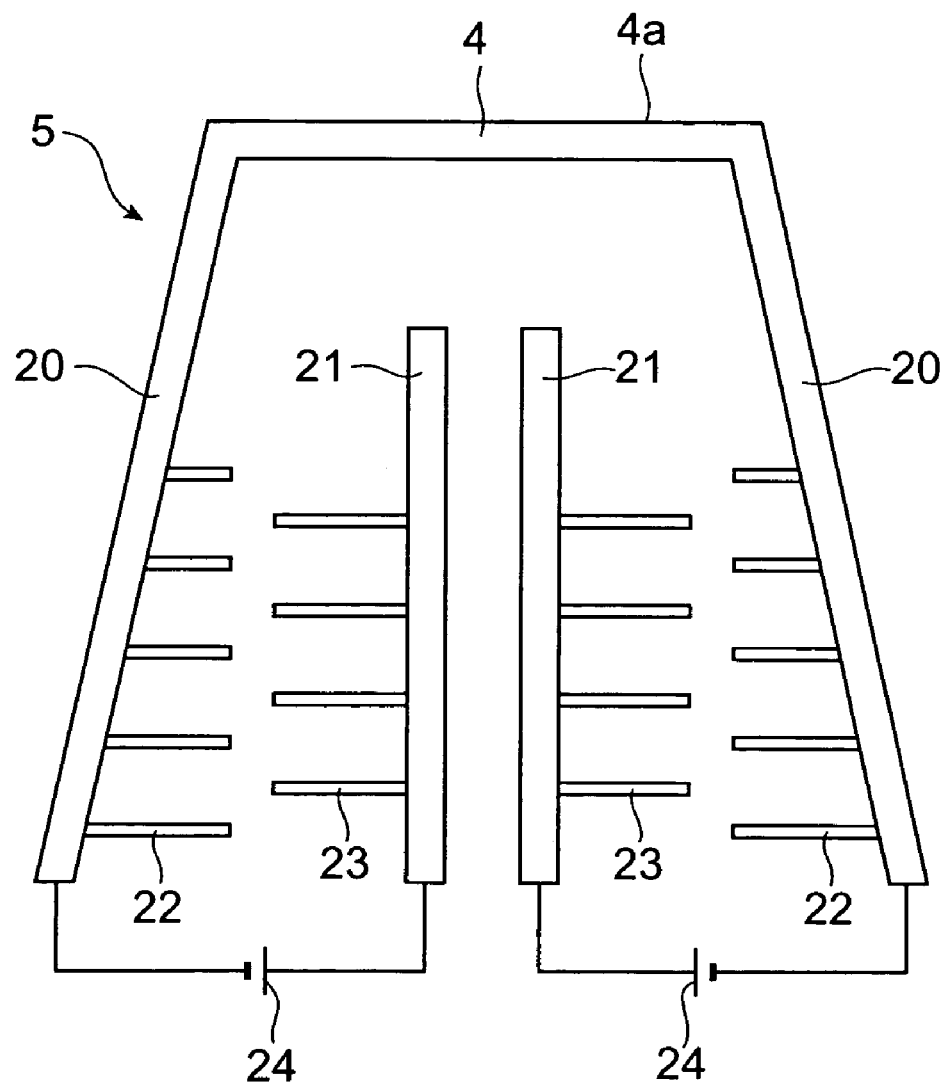
FIG. 10 is an illustration showing another specific configuration of a mirror driver shown in FIG. 1.

FIG. 10 is an illustration showing another configuration of mirror driver 5. The mirror driver 5 shown in the same figure has two movable electrodes 20 and two stationary electrodes 21. The two movable electrodes 20 are coupled and fixed to the both ends of the reflecting mirror 4 and extend backward from the reflecting mirror 4. The two stationary electrodes 21 are placed so as to be opposed to the movable electrodes 20 between these movable electrodes 20. Each movable electrode 20 has fingers 22 extending toward the stationary electrode 21, and each stationary electrode 21 has fingers 23 extending toward the movable electrode 20.

The reflecting mirror 4 and mirror driver 5 shown in FIG. 10 are produced in the same manner as the reflecting mirror 4 and the mirror driver 5 shown in FIG. 4, from the layer structure 201. In the reflecting mirror 4 shown in FIG. 10, the first portion 4c and the second portion 4d are also provided in order in the direction intersecting with the substrate 3, and the second portion 4d projects out in that direction from the mirror driver 5. Accordingly, the arrangement structure shown in FIG. 7 can be constructed by combining mirror array chips having the mirror drivers 5 of the structure shown in FIG. 10.

The movable electrode 20 and the stationary electrode 21 are coupled through a tunable voltage source 24. When a voltage is applied between the electrodes 20, 21 by this tunable voltage source 24, an electrostatic force generated between the two electrodes attracts the movable electrode 20 toward the stationary electrode 21, whereby the reflecting mirror 4 is bent in convex shape (cf. FIG. 11B).

Figure 11A:
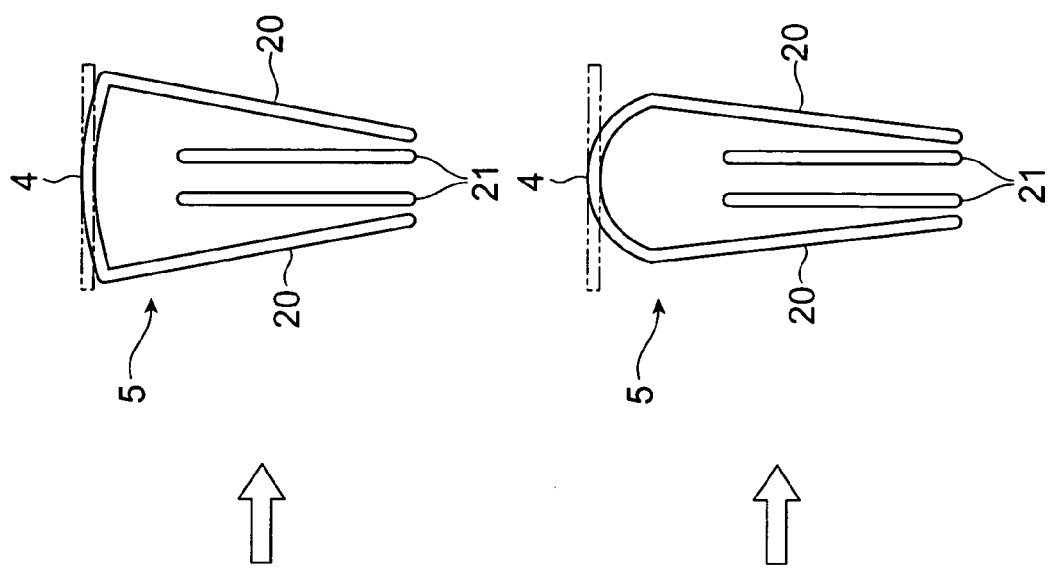
FIG. 11A is an illustration showing an operation state of a reflecting mirror and a mirror driver arranged as shown in FIG. 8.

In the structure in which a plurality of mirror drivers 5 shown in FIG. 10 are one-dimensionally arranged relative to the reflecting mirrors 4 (cf. FIG. 8), there is a limit to the width of the mirror drivers 5. FIG. 11A is an illustration showing an operation state of a reflecting mirror and a mirror driver arranged as shown in FIG. 8. In the case where the mirror drivers 5 are arranged as shown in FIG. 8, when a voltage is applied between the electrodes 20, 21, the displacement amount of the movable electrode 20 is small as shown in FIG. 11A, and the flexure amount of the reflecting mirror 4 is small.

Figure 11B:
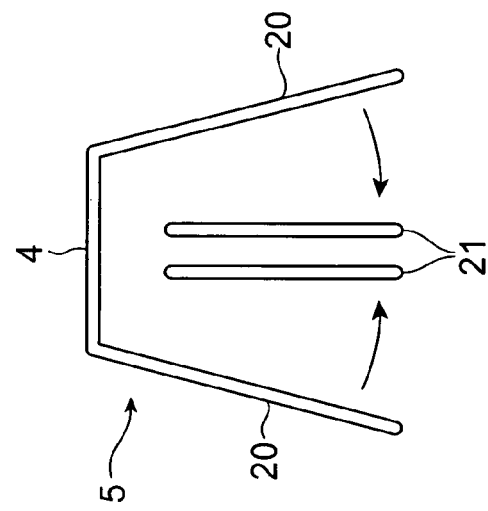
FIG. 11B is an illustration showing an operation state of a reflecting mirror and a mirror driver arranged as shown in FIG. 7.

In contrast to it, in the structure in which a plurality of mirror drivers 5 are two-dimensionally arranged relative to the plurality of reflecting mirrors 4 one-dimensionally arranged (cf. FIG. 7), the width $W_2$ of each mirror driver 5 can be set adequately larger than the width $W_1$ of each reflecting mirror 4. FIG. 11B is an illustration showing an operation state of a reflecting mirror and a mirror driver arranged as shown in FIG. 7. In the case where the reflecting mirrors and mirror drivers are arranged as shown in FIG. 7, when a voltage is applied between the electrodes 20, 21, the displacement amount of the movable electrode 20 is large as shown in FIG. 11B, whereby the flexure amount of the reflecting mirror 4 becomes large in conjunction therewith.

The mirror driver 5 shown in FIG. 10 has two stationary electrodes 21, but it is also possible to adopt a configuration wherein there is one stationary electrode and fingers are provided on both sides of the stationary electrode.

In the mirror driver 5 shown in FIG. 4 and FIG. 10, the reflecting mirror 4 in the initial state without application of voltage is of flat plate shape, but it is also possible to adopt a configuration wherein the reflecting mirror 4 in the initial state is of concave shape or convex shape and the reflecting mirror 4 is bent in the opposite direction with application of voltage.

Figure 12:
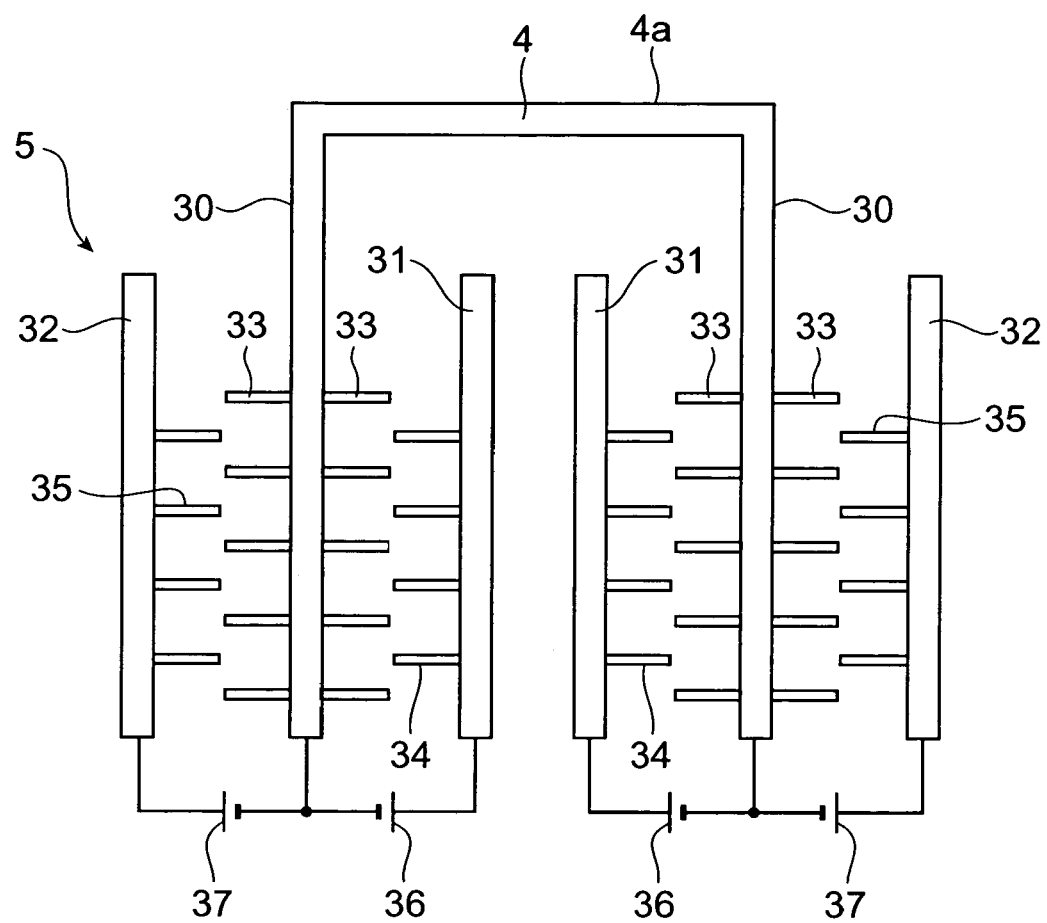
FIG. 12 is an illustration showing still another specific configuration of a mirror driver shown in FIG. 1.

FIG. 12 is an illustration showing still another configuration of mirror driver 5. In the same figure, the mirror driver 5 has two movable electrodes 30, two stationary electrodes 31, and two stationary electrodes 32. The two movable electrodes 30 are coupled and fixed to the both ends of the reflecting mirror 4 and extend backward from the reflecting mirror 4. The two stationary electrodes 31 are placed between these movable electrodes 30. The two stationary electrodes 32 are placed outside the respective movable electrodes 30. Each movable electrode 30 has fingers 33 extending on both sides, i.e., toward the stationary electrodes 31, 32, each stationary electrode 31 has fingers 34 extending toward the movable electrode 30, and each stationary electrode 32 has fingers 35 extending toward the movable electrode 30. The movable electrode 30 and stationary electrode 31 are coupled through a tunable voltage source 36, and the movable electrode 30 and stationary electrode 32 are coupled through a tunable voltage source 37. The number of stationary electrodes 31 may be one.

The reflecting mirror 4 and mirror driver 5 shown in FIG. 12 are produced in the same manner as the reflecting mirror 4 and mirror driver 5 shown in FIG. 4, from the layer structure 201. In the reflecting mirror 4 shown in FIG. 12, the first portion 4c and the second portion 4d are also provided in order in the direction intersecting with the substrate 3, and the second portion 4d projects out in that direction from the mirror driver 5. Therefore, the arrangement structure shown in FIG. 7 can be constructed by combining mirror array chips having the mirror drivers 5 of the structure shown in FIG. 12.

Figure 13:
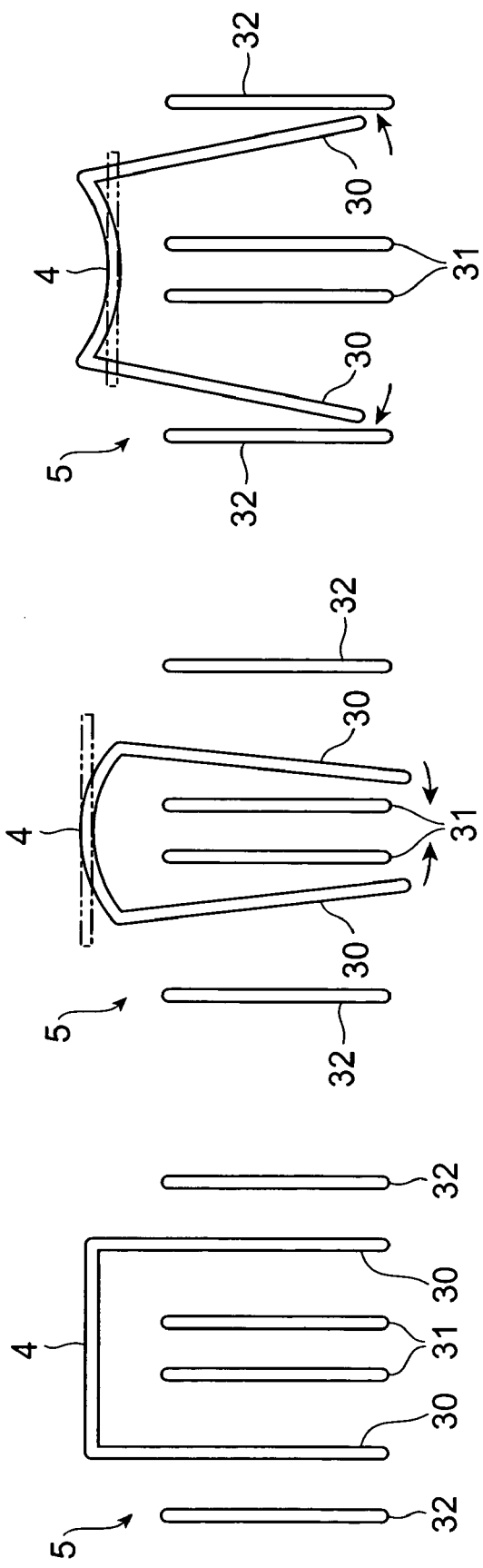
FIG. 13A is an illustration showing an initial state of a reflecting mirror and a mirror driver shown in FIG. 12.
FIG. 13B is an illustration showing a state of the reflecting mirror and mirror driver where the reflecting mirror shown in FIG. 12 is deformed in convex shape.
FIG. 13C is an illustration showing a state of the reflecting mirror and mirror driver where the reflecting mirror shown in FIG. 12 is deformed in concave shape.

FIG. 13A is an illustration showing the initial state of the reflecting mirror and mirror driver shown in FIG. 12. FIG. 13B is an illustration showing a state of the reflecting mirror and mirror driver when the reflecting mirror shown in FIG. 12 is deformed in convex shape. FIG. 13C is an illustration showing a state of the reflecting mirror and mirror driver when the reflecting mirror shown in FIG. 12 is deformed in concave shape. In the initial state shown in FIGS. 12 and 13A, when a voltage is applied between the movable electrodes 30 and the stationary electrodes 31 by the tunable voltage sources 36, the movable electrodes 30 are attracted toward the stationary electrodes 31 by electrostatic forces generated between them, as shown in FIG. 13B, whereby the reflecting mirror 4 is bent in convex shape. On the other hand, when a voltage is applied between the movable electrodes 30 and the stationary electrodes 32 by the tunable voltage sources 37, the movable electrodes 30 are attracted toward the stationary electrodes 32 by electrostatic forces generated between them, as shown in FIG. 13C, whereby the reflecting mirror 4 is bent in concave shape.

In the mirror driver 5 of this structure, the reflecting mirror 4 can be stably bent in the two directions, without causing large stress in the reflecting mirror 4.

Figure 14:
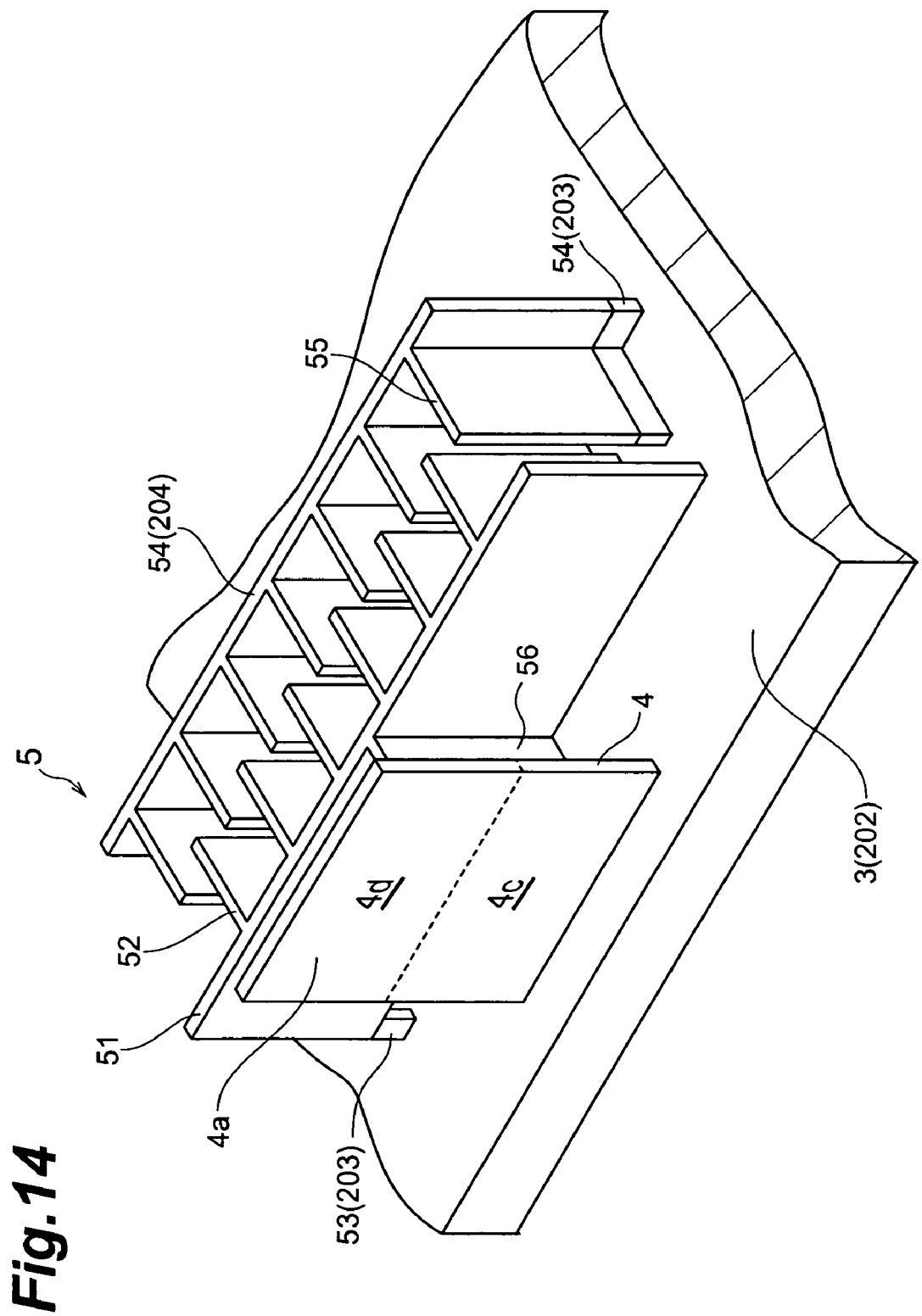
FIG. 14 is an illustration showing still another specific configuration of a mirror driver shown in FIG. 1.

FIG. 14 is an illustration showing still another specific configuration of a mirror driver shown in FIG. 1. The mirror driver 5 shown in FIG. 14 is provided in the space on the back side relative to the reflecting surface 4a of the reflecting mirror 4 and has a movable electrode 51, and a stationary electrode 54 facing the movable electrode 51. The movable electrode 51 has a main body part substantially parallel to the aforementioned predetermined plane in the initial state, and fingers 52 extending in a direction intersecting with the predetermined plane and toward the stationary electrode 54 from the main body part. A lower part at one end of the main body part of the movable electrode 51 is supported through a fixing part 53 on the substrate 3. The reflecting mirror 4 is supported on the movable electrode 51 through connection 56 extending in a direction intersecting with the predetermined plane from the main body part of the movable electrode 51. The stationary electrode 54 has a main body part facing the main body part of the movable electrode 51, and fingers 55 extending in the direction intersecting with the predetermined plane and toward the movable electrode 51 from the main body part.

In the mirror driver 5 shown in FIG. 14, the movable electrode 51 can be tilted around an axis extending in a direction intersecting with the substrate 3, and passing the fixing part 203, by a voltage applied between the movable electrode 51 and stationary electrode 54. Therefore, the reflecting mirror 4 is tilted with the tilt of the movable electrode 51.

The reflecting mirror 4 and the mirror driver 5 shown in FIG. 14 are produced in the same manner as the reflecting mirror 4 and the mirror driver 5 shown in FIG. 4, from the layer structure 201. In the reflecting mirror 4 shown in FIG. 14, the first portion 4c and the second portion 4d are also provided in order in the direction intersecting with the substrate 3, and the second portion 4d projects out in that direction from the mirror driver 5. Therefore, the arrangement structure shown in FIG. 7 can be constructed by combining mirror array chips having the mirror drivers 5 of the structure shown in FIG. 14.

Figure 15:
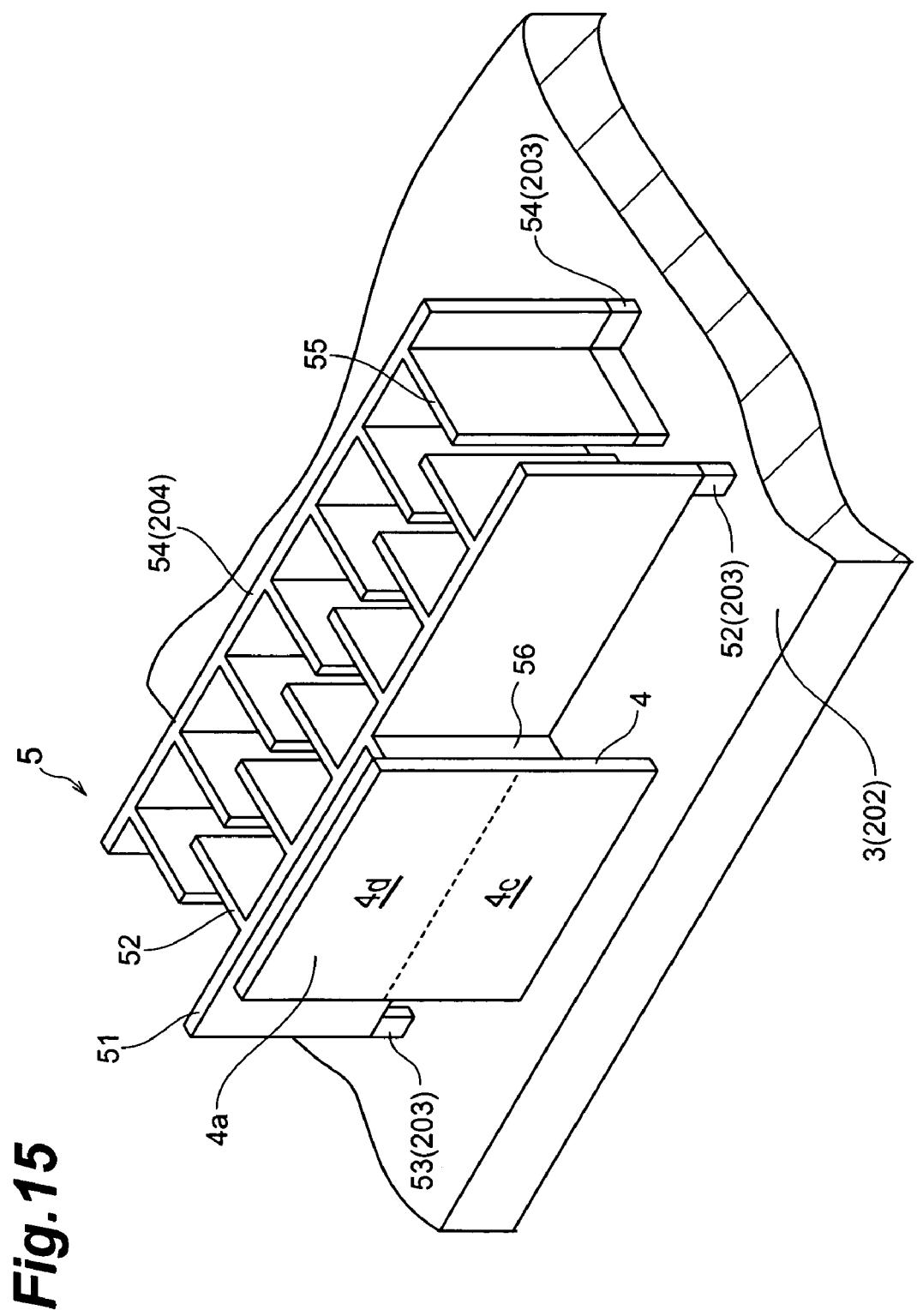
FIG. 15 is an illustration showing still another specific configuration of a mirror driver shown in FIG. 1.

FIG. 15 is an illustration showing still another specific configuration of a mirror driver shown in FIG. 1. The mirror driver 5 shown in FIG. 15 is different from the mirror driver 5 shown in FIG. 14 in that the lower parts at the both ends of the main body part of the movable electrode 51 are supported through fixing portions 53 on the substrate 3. In the mirror driver 5 shown in FIG. 15, therefore, the movable electrode 51 is bent in a direction intersecting with the predetermined plane (transverse direction) by a voltage applied between the movable electrode 51 and the stationary electrode 54, whereby the reflecting mirror 4 moves in that direction.

Figure 16:
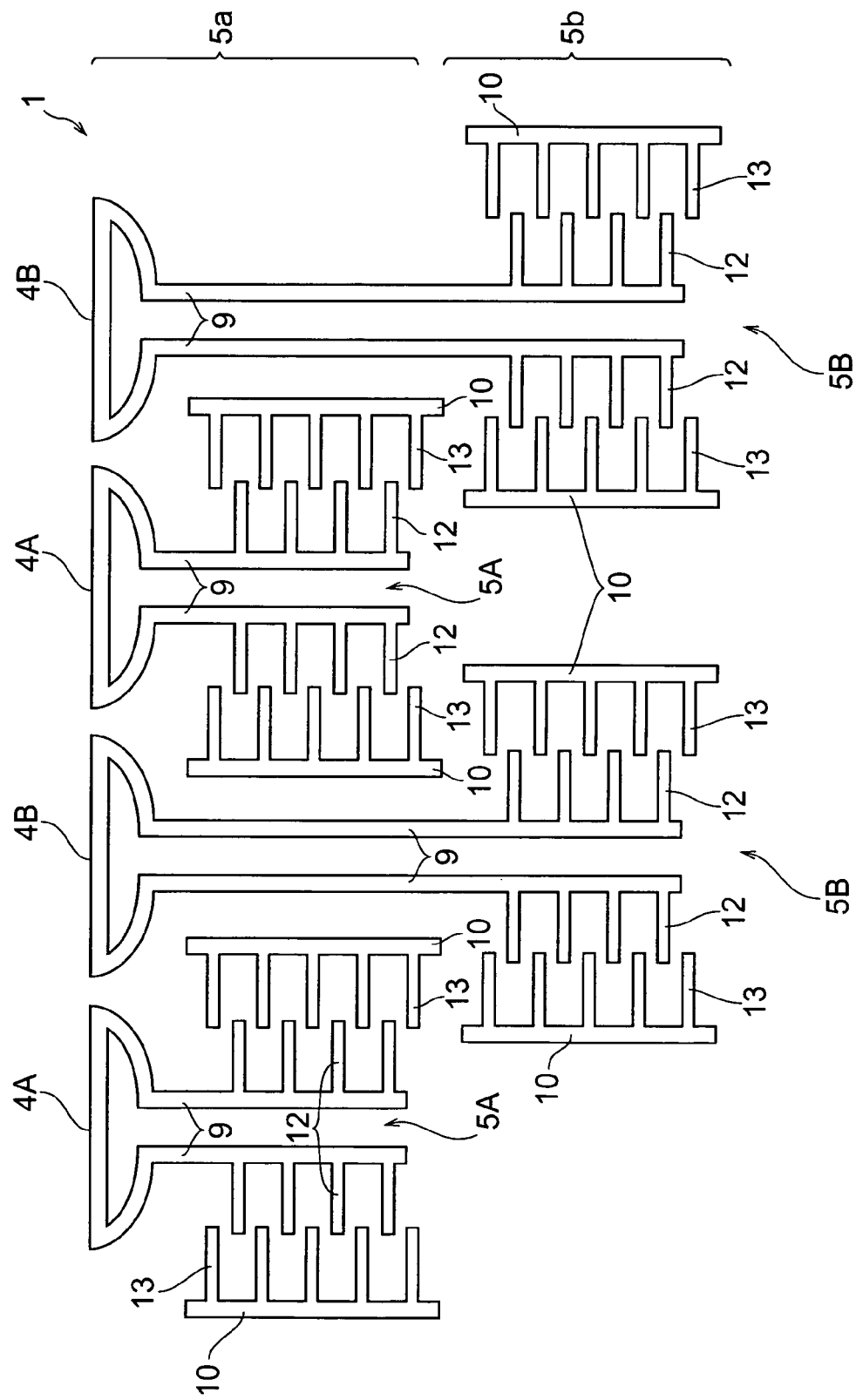
FIG. 16 is an illustration showing another arrangement structure of reflecting mirrors and mirror drivers.

FIG. 16 is an illustration showing another arrangement structure of reflecting mirrors and mirror drivers. In the movable mirror device 1 having the arrangement structure shown in FIG. 16, the first region 5a and the second region 5b are located in order in a direction intersecting with the predetermined plane along which the reflecting mirrors 4A and 4B are arranged.

The mirror drivers similar to the structure shown in FIG. 4 are used in the movable mirror device 1 shown in FIG. 16. Specifically, as shown in FIG. 16, each mirror driver 5A has movable electrodes 9 with a short main body part extending in a direction intersecting with the reflecting mirror 4A, and each mirror driver 5B has electrodes 9 with a long main body part extending in a direction intersecting with the reflecting mirror 4B. In the mirror driver 5A, stationary electrodes 10, fingers 12, and fingers 13 are located in the first region 5a; in the mirror driver 5B, stationary electrodes 10, fingers 12, and fingers 13 are located in the second region 5b.

In this manner, the mirror drivers may be two-dimensionally arranged by providing the mirror drivers 5A and the mirror drivers 5B alternately in the first region 5a and in the second region 5b, the first region 5a and the second region 5b being located in order in the direction intersecting with the predetermined plane.

Figure 17:
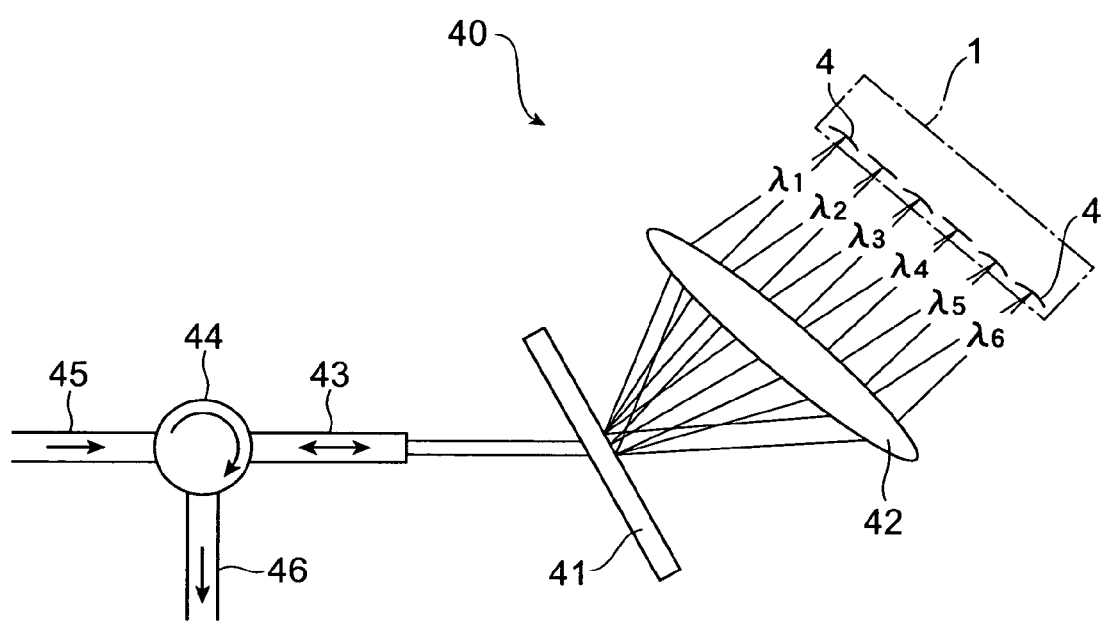
FIG. 17 is a configuration diagram showing an example of a dispersion compensator provided with a movable mirror device according to an embodiment of the present invention.

FIG. 17 is a configuration diagram showing an example of a dispersion compensator provided with a movable mirror device according to an embodiment of the present invention. In the same figure, the dispersion compensator 40 is a device to implement dispersion compensation of signal light by giving input signal light a phase shift.

The dispersion compensator 40 has a diffraction grating 41, the aforementioned movable mirror device 1, and a lens 42 disposed between the diffraction grating 41 and the movable mirror device 1. The diffraction grating 41 separates signal light coming from an optical transmission path 43 for dispersion compensation, into wavelength components (channels). In the movable mirror device 1 the reflecting mirrors 4 are arranged with little clearance, in order to create a continuous wavelength band space. The reflecting mirrors 4 each reflect the signal light separated into the wavelength components at the diffraction grating 41.

The dispersion-compensation optical transmission path 43 is coupled through optical circulator 44 to input optical transmission path 45 and to output optical transmission path 46. The optical circulator 44 is an optical component for turning the traveling direction of light.

In the dispersion compensator 40 of this structure, signal light fed into the input optical transmission path 45 travels through the optical circulator 44 and emerges from the dispersion-compensation optical transmission path 43 and it is then separated into wavelength bands at the diffraction grating 41. Then the separate signal light beams propagate through the lens 42 to the movable mirror device 1 and are reflected by the respective reflecting mirrors 4.

In this case, the flexure amount (curvature) of each reflecting mirror 4 is controlled so as to compensate for dispersion by giving desired phase differences among the signal light beams of the separate channels. The signal light beams reflected by the respective reflecting mirrors 4 again propagate through the lens 42 to the diffraction grating 41 and are combined at the diffraction grating 41. Then the combined signal light travels through the dispersion-compensation optical transmission path 43, optical circulator 44, and output optical transmission path 46 to be outputted.

Here the movable range of the reflecting mirrors 4 is adequately large, as described above, so that a satisfactorily large amount of dispersion compensation can be given. For this reason, it is feasible to achieve good controllability of dispersion compensation in each channel and to achieve the dispersion compensation of each channel with high accuracy.

Figure 18:
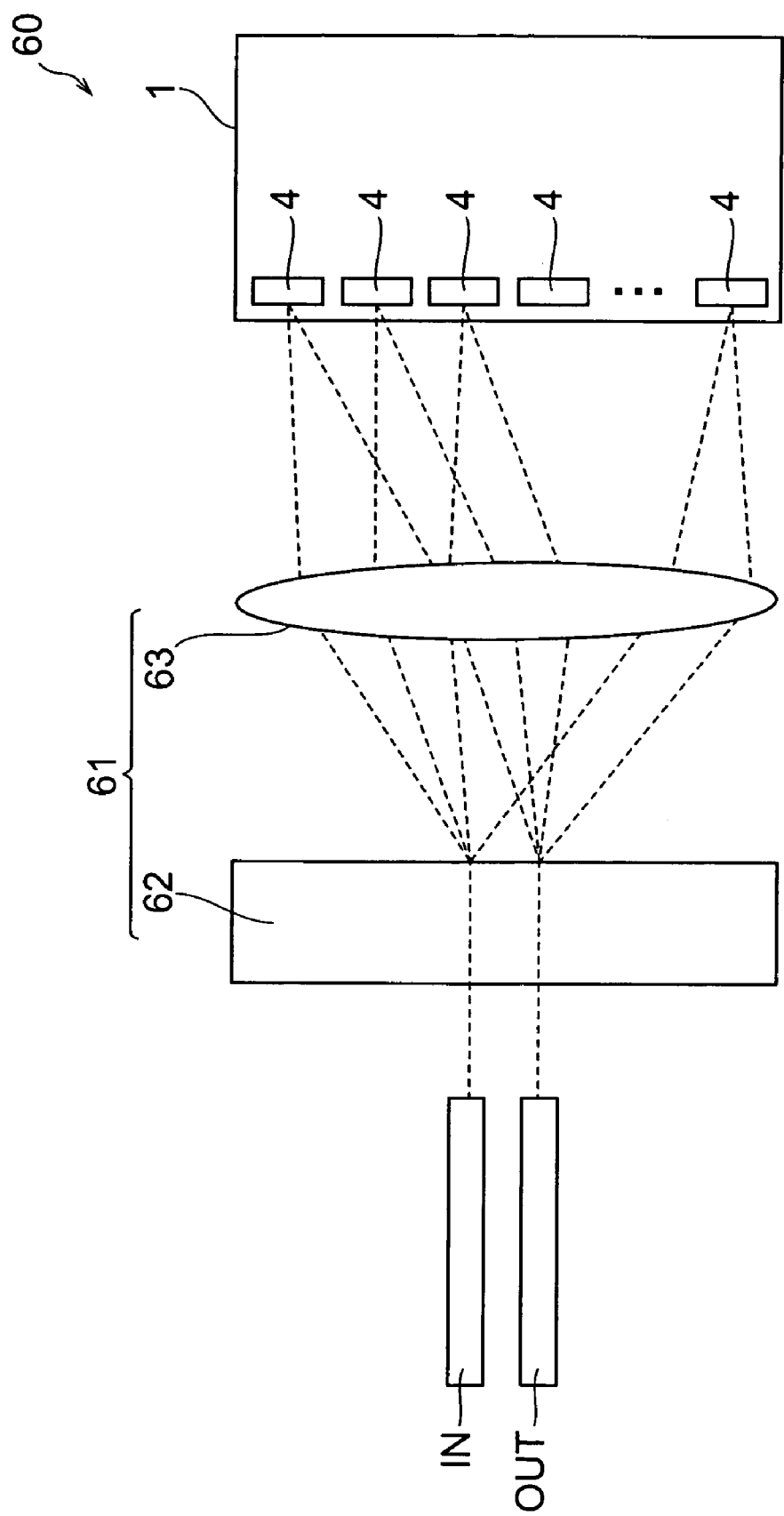
FIG. 18 is a configuration diagram showing an example of a gain equalizer provided with a movable mirror device according to an embodiment of the present invention.

FIG. 18 is a configuration diagram showing an example of a gain equalizer provided with a movable mirror device according to an embodiment of the present invention. The gain equalizer 60 shown in FIG. 18 is a device for equalizing gains of respective wavelength components of input signal light.

The gain equalizer 60 has an input light waveguide IN, an output light waveguide OUT, a multiplexer/demultiplexer 61, and a movable mirror device 1. The multiplexer/demultiplexer 61 is composed of a transmission type diffraction grating element 62, and a lens 63. The gain equalizer 60 can use the movable mirror device 1 having the mirror drivers of the structure shown in FIG. 14 or in FIG. 15.

In the gain equalizer 60, input signal light fed into the input light waveguide IN is separated on a wavelength-by-wavelength basis by the diffraction grating element 62 to yield a plurality of signal light beams. The plurality of signal light beams are incident through the lens 63 to the different reflecting mirrors 4 for respective wavelengths. The plurality of signal light beams reflected by the reflecting mirrors 4 are incident through the lens 63 to the diffraction grating element 62 to be combined, and thereafter the combined light is outputted into the output light waveguide OUT.

With use of the mirror drivers 5 in the structure shown in FIG. 14, the gain equalizer 60 can equalize the gains of the respective wavelength components of the signal light outputted to the output light waveguide OUT by changing the reflection directions of the respective reflecting mirrors 4. With use of the mirror drivers 5 in the structure shown in FIG. 15, the gain equalizer 60 can equalize the gains of the respective wavelength components of the signal light outputted to the output light waveguide OUT by moving the reflecting mirrors 4 back and forth.

In the movable mirror device 1 of the present embodiment, as described above, the tilt angles or positions of the reflecting mirrors 4 arranged at a narrow pitch can be individually adjusted. The movable range of the reflecting mirrors 4 is large. Therefore, the movable mirror device 1 can be suitably used as a component of the gain equalizer.

Figure 19:
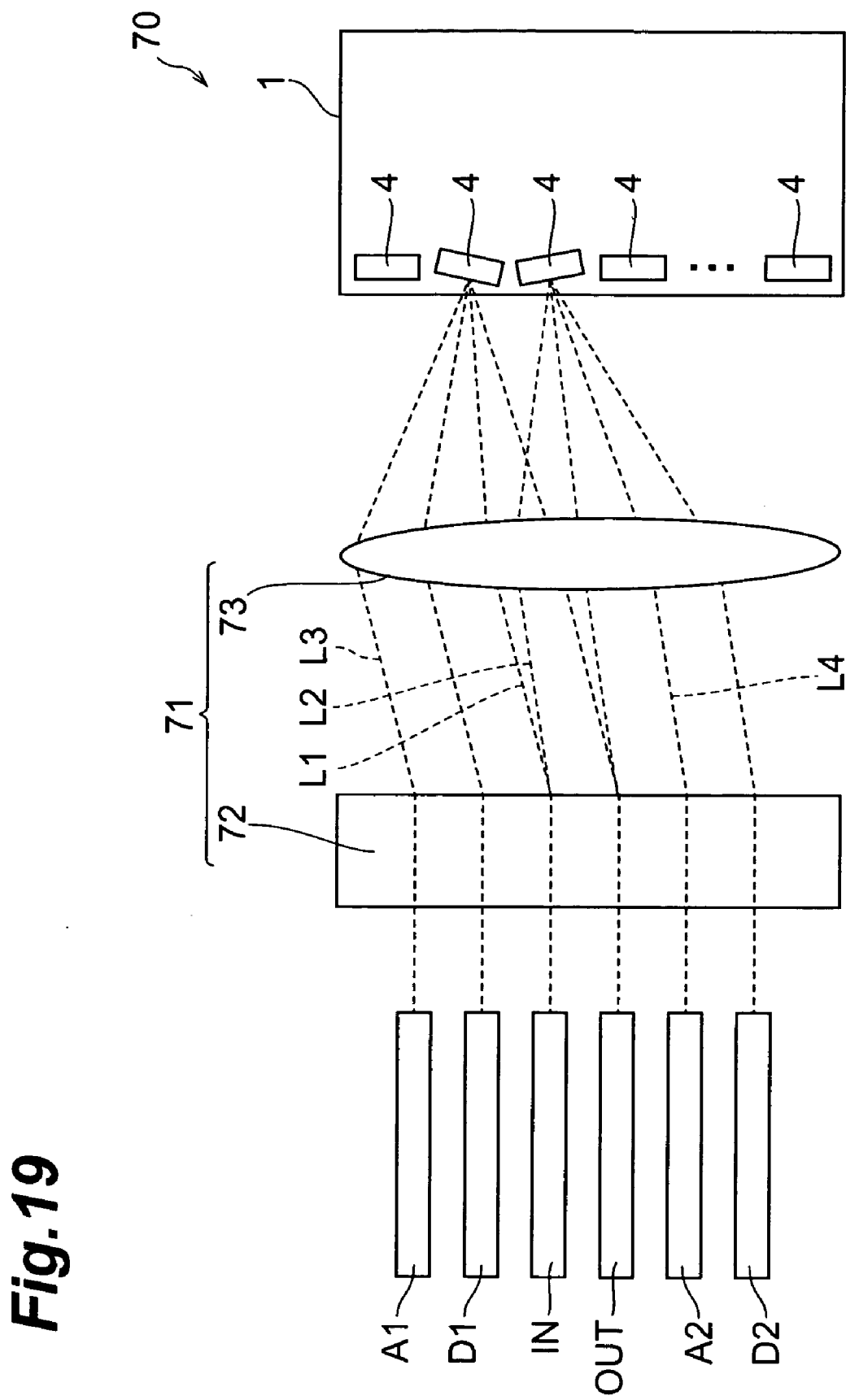
FIG. 19 is a configuration diagram showing an example of an optical ADM apparatus provided with a movable mirror device according to an embodiment of the present invention.

FIG. 19 is a configuration diagram showing an example of an optical ADM apparatus provided with a movable mirror device according to an embodiment of the present invention. The optical ADM apparatus 70 shown in FIG. 19 is able to output signal light of a desired wavelength component (Drop signal light) included in input signal light, to an arbitrary Drop port and to output Add signal light from an arbitrary Add port to a common output port.

The optical ADM apparatus 70 shown in FIG. 19 has a common input port waveguide IN, a common output port waveguide OUT, an Add port waveguide A1, an Add port waveguide A2, a Drop port waveguide D1, a Drop port waveguide D2, a multiplexer/demultiplexer 71, and a movable mirror device 1. The multiplexer/demultiplexer 71 is comprised of a transmission type diffraction grating element 72 and a lens 73.

In the optical ADM apparatus 70 in the state shown in FIG. 19, input signal light from the common input port waveguide IN is separated into wavelength components by the diffraction grating element 72 to yield a plurality of signal light beams. A signal light beam L1 of a wavelength $\lambda_2$ is reflected by a reflecting mirror 4 and thereafter is outputted through the lens 73 to the Drop port waveguide D1. A signal light beam L2 of a wavelength $\lambda_3$ is reflected by a reflecting mirror 4 and thereafter is outputted through the lens 73 to the Drop port waveguide D2.

A signal light beam L3 of the wavelength $\lambda_2$ from the Add port waveguide A1 and a signal light beam L4 of the wavelength $\lambda_3$ from the Add waveguide A2 are reflected by the respectively corresponding reflecting mirrors 4 and thereafter are incident through the lens 73 to the diffraction grating element 72. The signal light beam L3, the signal light beam L4, and the signal light beams of the other components than the wavelength $\lambda_2$ and the wavelength $\lambda_3$ of the input signal light are combined by the diffraction grating element 72 and outputted as output signal light to the common output port waveguide OUT.

In this manner, the movable mirror device 1 of the present embodiment can individually adjust the reflection directions of the reflecting mirrors 4 arranged at a narrow pitch. The movable range of the reflecting mirrors 4 is large. Therefore, the movable mirror device 1 can be suitably used as a component of the optical ADM apparatus.

The above embodiment showed an application example of the movable mirror device to the dispersion compensator, the gain equalizer, and the optical ADM apparatus, but, without having to be limited only to such a dispersion compensator, gain equalizer, and optical ADM apparatus, the movable mirror device of the present invention can also be applied to any optical device requiring the wide movable range of the reflecting mirrors while narrowing the arrangement pitch of the reflecting mirrors.

As the preferred embodiments were described above, the present invention succeeded in arranging the plurality of reflecting mirrors at a narrow pitch and increasing the movable range of the reflecting mirrors by the configuration wherein the plurality of mirror drivers for individually moving the plurality of reflecting mirrors one-dimensionally arranged are two-dimensionally arranged relative to the reflecting mirrors.

What is claimed is:

1. A movable mirror device comprising:
a plurality of reflecting mirrors for reflecting signal light, the reflecting mirrors being arranged in a one-dimensional direction along a predetermined plane;
a plurality of mirror drivers for driving the respective reflecting mirrors individually, the plurality of mirror drivers being arranged two-dimensionally relative to the one-dimensional direction; and
a first substrate and a second substrate facing each other,
wherein the plurality of mirror drivers are alternately provided in a first region and in a second region, the first region and the second region being located in order in a direction intersecting with the one-dimensional direction,
wherein the plurality of reflecting mirrors include first mirrors provided on the first substrate and second mirrors provided on the second substrate,
wherein the plurality of mirror drivers include first drivers provided on the first substrate and adapted to drive the first mirrors, and second drivers provided on the second substrate and adapted to drive the second mirrors,
wherein the predetermined plane extends in a direction intersecting with the first substrate and with the second substrate, the one-dimensional direction is a direction substantially parallel to the first substrate and the second substrate, and the first mirrors and the second mirrors are alternately arranged between the first substrate and the second substrate, and
wherein the first region and the second region are located in order in a direction from the first substrate to the second substrate, the first drivers are located in the first region, and the second drivers are located in the second region.

2. The movable mirror device according to claim 1, wherein the first mirrors and the second mirrors are provided along the predetermined plane in the first region and in the second region.

3. The movable mirror device according to claim 1, wherein at least one of the first substrate and the second substrate is provided with a plurality of support members for coupling the first substrate to the second substrate.

4. The movable mirror device according to claim 3, wherein the support members comprise positioning means for positioning the first substrate relative to the second substrate.

5. The movable mirror device according to claim 1, wherein the reflecting mirrors are deformable in curved shape, and wherein the mirror drivers deform the reflecting mirrors in curved shape.

6. The movable mirror device according to claim 5, wherein each of the mirror drivers has two movable electrodes fixed to two side portions of the reflecting mirror, and two stationary electrodes each placed outside the respective movable electrodes, and the reflecting mirror is deformed in curved shape by applying a voltage between the movable electrodes and the stationary electrodes.

7. The movable mirror device according to claim 5, wherein each of the mirror drivers has two movable electrodes fixed to two side portions of the reflecting mirror in the one-dimensional direction and extending in a direction intersecting with the predetermined plane, and two stationary electrodes extending in a direction intersecting with the predetermined plane outside the movable electrodes in the one-dimensional direction, wherein the reflecting mirror is supported at a portion along a center axis intersecting with the one-dimensional direction, and wherein the movable electrodes are moved toward the stationary electrodes by a voltage applied between the movable electrodes and the stationary electrodes.

8. The movable mirror device according to claim 5, wherein each of the mirror drivers has two movable electrodes fixed to two side portions of the reflecting mirror, and a stationary electrode placed between the movable electrodes, and the reflecting mirror is deformed in curved shape by applying a voltage between the movable electrodes and the stationary electrode.

9. The movable mirror device according to claim 5, wherein each of the mirror drivers has two movable electrodes fixed to two side portions of the reflecting mirror in the one-dimensional direction and extending in a direction intersecting with the predetermined plane, and a stationary electrode extending in a direction intersecting with the predetermined plane and placed between the movable electrodes, wherein the reflecting mirror is supported at a portion along a center axis intersecting with the one-dimensional direction, and wherein the movable electrodes are moved toward the stationary electrode by a voltage applied between the movable electrodes and the stationary electrode.

10. A dispersion compensator comprising:

light demultiplexing means for demultiplexing input signal light on a wavelength-by-wavelength basis and outputting a plurality of signal light beams;

the movable mirror device as set forth in claim 1, to which the plurality of signal light beams are incident and which reflects the beams while providing the signal light beams with a phase shift; and light multiplexing means for multiplexing the plurality of signal light beams reflected from the movable mirror device and for outputting multiplexed signal light.

11. A gain equalizer comprising:

light demultiplexing means for demultiplexing input signal light on a wavelength-by-wavelength basis and outputting a plurality of signal light beams;

the movable mirror device as set forth in claim 1, to which the plurality of signal light beams are incident and which changes directions of reflection of the signal light beams; and light multiplexing means for multiplexing the plurality of signal light beams reflected from the movable mirror device and for outputting multiplexed signal light.

12. An optical ADM apparatus comprising:

an input port waveguide through which input signal light is supplied;

an output port waveguide through which output signal light is supplied;

an add port waveguide through which an add signal is supplied;

a drop port waveguide through which a drop signal is supplied;

light demultiplexing means for demultiplexing the input signal light from the input port waveguide on a wavelength-by-wavelength basis and for outputting a plurality of signal light beams;

the movable mirror device as set forth in claim 1, to which the plurality of signal light beams and the add signal from the add port waveguide are incident and which changes directions of reflection of the signal light beams and the add signal and outputs them; and light multiplexing means for multiplexing part of the signal light beams outputted from the movable mirror device, as a drop signal to the drop port waveguide, and outputting the output signal light resulting from combination of the other part of the signal light beams with the add signal, to the output port waveguide.

* * * * *